April 22, 1969  E. H. WARNE  3,439,625
GEAR PUMPS
Filed March 10, 1967

United States Patent Office 3,439,625
Patented Apr. 22, 1969

3,439,625
GEAR PUMPS
Eugene Harold Warne, Solihull, England, assignor to Joseph Lucas (Industries) Limited, Birmingham, England
Filed Mar. 10, 1967, Ser. No. 622,281
Claims priority, application Great Britain, Mar. 23, 1966, 12,801/66
Int. Cl. F04c 1/04
U.S. Cl. 103—126                1 Claim

ABSTRACT OF THE DISCLOSURE

A gear pump has a pair of meshing gears having asymmetrical teeth with involute operative faces and having the inoperative faces relieved as compared with symmetrical involute gear teeth to provide an increase volume space between two pairs of meshing teeth on the gears.

---

This invention relates to gear pumps having a pair of meshing gears.

In conventional gear pump the teeth are normally of symmetrical involute form. It is a feature of gear pumps, unlike pairs of gears for other purposes, that rotation is always in the same direction so that one face only (hereinafter termed the operative face) of each of the teeth always meshes with a corresponding face of a tooth of the other gear and the opposite face (hereinafter termed the inoperative face) of each of the teeth is never, whilst the gear pump is in operation, in engagement with a corresponding face on a tooth on the other gear. It is also a known fact that substantial hydraulic pressures are built up in a space defined between a pair of gears in mesh when there is contact between the operative faces to two pairs of successive teeth. The reason for the hydraulic pressure generation is that the volume of this space is decreased during a portion of the cycle and there is, during this portion, no opportunity for the escape of liquid. This generated hydraulic pressure can increase wear of the operative faces of the gears by increasing pressure of contact. Moreover, during sealing contact between the two pairs of successive teeth, the shape of this space varies as the teeth move, the shape defining a variable restriction between the regions adjacent the root circles of the two gears respectively, one of these regions becoming larger as the other decreases in volume, thereby further tending to increase wear upon the operative faces of the teeth of the gears.

The object of the invention is to provide a gear pump in a convenient form whereby these detrimental effects are minimised.

A gear pump according to the invention is characterised in that all the teeth of both gears are asymmetrical and have involute operative faces, the asymmetry of each tooth being such that the inoperative face of the tooth is relieved as compared with a symmetrical involute tooth, the inoperative face of each tooth being uniform throughout its axial length.

Figure 1:
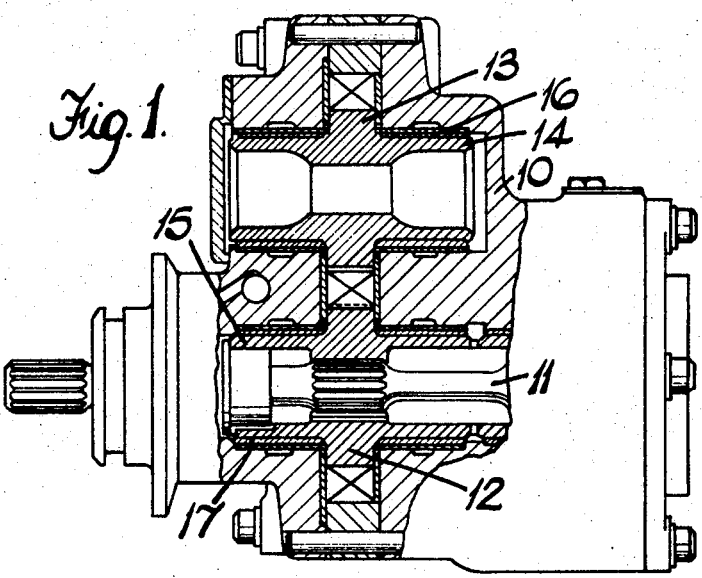
Figure 2:
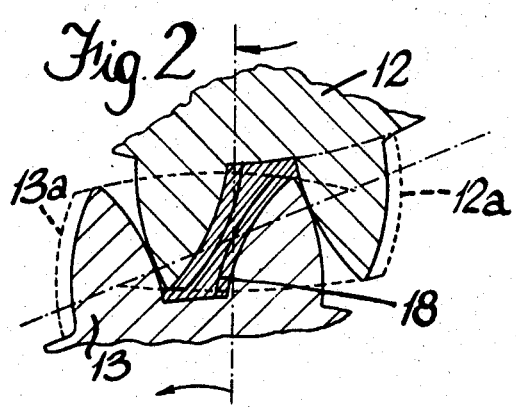

The invention will now be described by way of example with reference to the accompanying drawings in which:

FIGURE 1 is a cross-sectional view of a gear pump incorporating the invention, and FIGURE 2 is a fragmentary cross-sectional view of the two meshing gears of the pump.

In FIGURE 1 there is shown a gear pump having a body 10 into which extends a driving shaft 11. Two meshing gears 12, 13 are disposed within the body, the former being connected to the driving shaft 11. The gears 12, 13 have hollow shaft extensions 14, 15 respectively, mounted for rotation in the body 10 in bearing structures 16 and 17 respectively. At opposite sides of the point of meshing of the two gears 12, 13 the body 10 has an inlet and an outlet (not shown) for liquid being pumped. The gears 12, 13 are externally toothed straight out spur gears and as shown in FIGURE 2 have asymmetrical teeth having standard involute form on the operative faces, but the inoperative faces are formed as shown as also of involute form but the dotted lines 12a, 13a respectively show the comparative shapes of standard involute teeth. By this arrangement a space 18 defined between two pairs of successive meshing teeth is substantially larger than would be the case if the teeth were of symmetrical involute form. The inoperative faces are moreover uniform throughout their axial lengths.

Although in this example the inoperative faces are shown to be of involute form this is not essential. Symmetry of the teeth as referred to herein, is considered in relation to a radial plane with respect to the appropriate gear as a whole. Factors governing the shapes of the inoperative faces include the necessity to avoid jamming of the teeth in the event of reverse rotation, for example when the pump is not in use, and also tooth width circumferentially of the gear, must be consistent with strength requirements.

With this arrangement, the volume of liquid in the space 18 is larger than would be the case in pumps with symmetrical involute teeth, thus ensuring that reduction in volume does not result in the generation of such high hydraulic pressures. Furthermore, the clearance of backlash between adjacent teeth in mesh is such that the restriction afforded between the two end regions of the space 18 is such that flow between the reducing region and the increasing region can readily take place.

It is to be understood that this invention can also be applied to gear pumps having otherwise modified involute gear tooth forms.

Having thus described my invention what I claim as new and desire to secure by Letters Patent is:

1. A gear pump characterised in that all the teeth of both gears are asymmetrical and have involute operative faces, the asymmetry of each tooth being such that the inoperative face of the tooth is relieved as compared with a symmetrical involute tooth, the inoperative face of each tooth being of involute form and being uniform throughout its axial length.

References Cited

UNITED STATES PATENTS

| 171,651 | 1/1876 | Crocker. |
| 295,597 | 3/1884 | Troutman. |
| 1,182,967 | 5/1916 | Bowser. |
| 1,923,268 | 8/1933 | Jensen. |
| 2,601,003 | 6/1952 | Pontius. |

FOREIGN PATENTS

| 578,809 | 7/1946 | Great Britain. |

DONLEY J. STOCKING, Primary Examiner.

W. J. GOODLIN, Assistant Examiner.